(12) United States Patent
MacNeille et al.

(10) Patent No.: US 10,423,130 B2
(45) Date of Patent: Sep. 24, 2019

(54) METHOD AND APPARATUS FOR WEATHER MODELING AND VEHICULAR ACCOMMODATION

(71) Applicant: FORD GLOBAL TECHNOLOGIES, LLC, Dearborn, MI (US)

(72) Inventors: Perry Robinson MacNeille, Lathrup Village, MI (US); Yimin Liu, Ann Arbor, MI (US); David Charles Weber, Toledo, OH (US); Steven Joseph Szwabowski, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 15 days.

(21) Appl. No.: 15/812,008

(22) Filed: Nov. 14, 2017

(65) Prior Publication Data

US 2019/0146427 A1 May 16, 2019

(51) Int. Cl.
| | |
|---|---|
| *G06F 17/50* | (2006.01) |
| *G01W 1/10* | (2006.01) |
| *G05B 13/04* | (2006.01) |
| *B60W 50/00* | (2006.01) |

(52) U.S. Cl.
CPC ....... *G05B 13/041* (2013.01); *B60W 50/0097* (2013.01); *B60W 2050/0014* (2013.01)

(58) Field of Classification Search
CPC ....... G05B 13/041; B60W 40/06; F24F 11/00; G06F 17/50; G08G 5/00; G01C 1/00; G01W 1/10
See application file for complete search history.

(56) References Cited

U.S. PATENT DOCUMENTS

| | | | | |
|---|---|---|---|---|
| 9,187,099 | B2* | 11/2015 | Powers | B60W 40/06 |
| 9,824,593 | B1* | 11/2017 | Kronfeld | G08G 5/0043 |
| 2008/0002190 | A1* | 1/2008 | Romain | G01C 21/005 |
| | | | | 356/139.01 |
| 2011/0313647 | A1* | 12/2011 | Koebler | B60L 15/2045 |
| | | | | 701/123 |
| 2014/0278331 | A1* | 9/2014 | Mewes | G06F 17/5009 |
| | | | | 703/17 |
| 2014/0324351 | A1* | 10/2014 | Dannevik | G01W 1/10 |
| | | | | 702/3 |
| 2016/0305678 | A1* | 10/2016 | Pavlovski | G05B 13/048 |

* cited by examiner

*Primary Examiner* — Yuri Kan
(74) *Attorney, Agent, or Firm* — Frank Lollo; Brooks Kushman P.C.

(57) ABSTRACT

A system includes a processor configured to receive weather data including a plurality of measured data points in an area around a vehicle, from a remote weather server. The processor is also configured to receive a path from a vehicle subsystem. The processor is further configured to combine the data points and path to form a predictive model reflecting expected weather conditions along the path at future times, the model based on predefined parameters defining expected weather behavior and send the model to a requesting vehicle subsystem.

17 Claims, 6 Drawing Sheets

METHOD AND APPARATUS FOR WEATHER MODELING AND VEHICULAR ACCOMMODATION

TECHNICAL FIELD

The illustrative embodiments generally relate to methods and apparatuses for weather modeling and vehicular accommodation.

BACKGROUND

Weather and traffic have always been the bane of travelers, creating delays, route changes and even hazardous conditions. Further, a user headed to an outdoor destination, for example, may have a great deal of interest in ensuring that the destination will include pleasant weather.

Weather reporting services and models have improved over the years, but they still typically rely on finite data points gathered by fixed locations, and extrapolation of weather data based on the data points gathered at the fixed locations. While weather data may be available and customizable for a vehicle, it is frequently unavailable due to intermittent vehicle-cloud connections. Vehicles may include some sensors that allow for data gathering, but including comprehensive sensors in vehicles can significantly increase the cost of a vehicle, and since the data gathered is as much useful to others as it is to the driver (as the driver is already located at, and thus affected by, the weather) there is little interest in the consumer community to pay a premium for vehicles including advanced sensor capability.

SUMMARY

In a first illustrative embodiment, a system includes a processor configured to receive weather data including a plurality of measured data points in an area around a vehicle, from a remote weather server. The processor is also configured to receive a path from a vehicle subsystem. The processor is further configured to combine the data points and path to form a predictive model reflecting expected weather conditions along the path at future times, the model based on predefined parameters defining expected weather behavior and send the model to a requesting vehicle subsystem.

In a second illustrative embodiment, a computer-implemented method includes modeling a plurality of expected values for a weather aspect based on measured data points received from a remote server and predefined modeling parameters, including varying the predefined parameters to produce the plurality of expected values. The method also includes comparing a real-time measured aspect value against a modeled expected aspect value for each of the plurality of expected values and selecting a modified parameter set corresponding to the expected value demonstrating the most minimal difference from the real-time value.

In a third illustrative embodiment, a system includes a processor configured to model a plurality of weather aspects over a vehicle path, received from a vehicle subsystem, based on measured data points received from a remote server and predefined modeling parameters. The processor is also configured to adjust onboard weather model parameters, as a vehicle travels the path, to maintain a weather model for which periodic real-time measurements compared to expected values obtained from the weather model remain below a threshold deviance.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
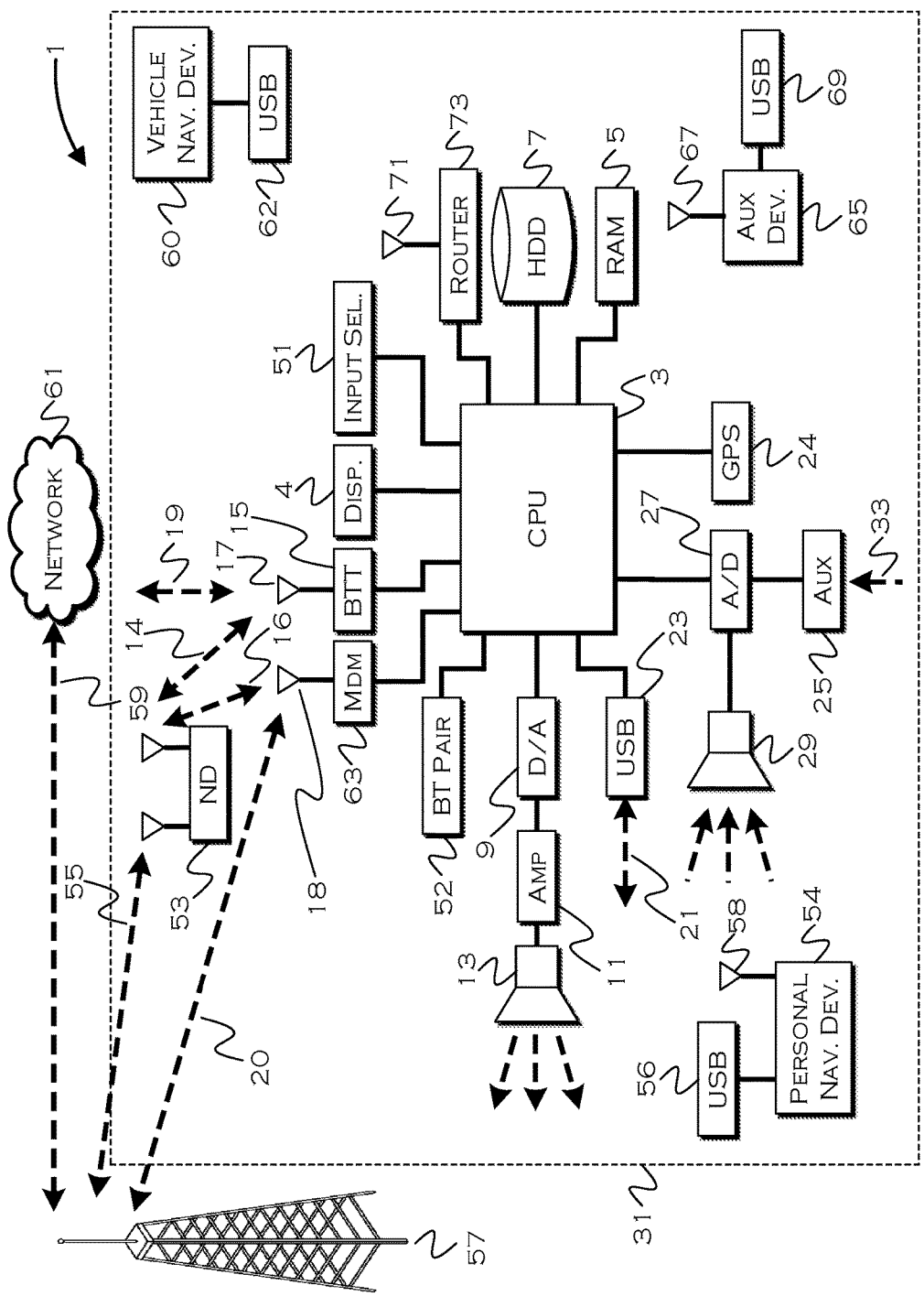
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device 62 such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols (IR communication not shown in FIG. 1).

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative embodiments, a vehicle system may received weather data representing a predictive weather model with synoptic weather features modeled in both space and time. In traditional weather forecasting, data points are collected at various locations and elevations and plotted on a three dimensional map. Synoptic features may be manually drawn on the map by an expert meteorologist. In a few hours the process is repeated and the meteorologist observes the changes in the synoptic features. The rate at which the synoptic features have moved can be used to predict where they will be in the future.

In modem meteorology this modeling process may be done automatically in a computer with macro-meteorological models that consider not only the feature movements, but also the forces that control the movements. For example, the eye of a hurricane would be a synoptic feature. A simple model would plot the location, strength, etc. of the feature over several time steps then extrapolate its future location, strength, etc. State of the art modeling would consider the effects of synaptic features on each other, i.e. the effect of the jet stream on the eye and visa-versa. This weather data is expressed as a high-dimensional model (4D) and can be downloaded to the vehicle well in advance of when it is needed.

In the illustrative embodiments, the processor may expose a request-response interface to other vehicle modules in which a request includes a curved line or curved surface in space-time where the weather is estimated. Typically, the estimates are expressed as stochastic variables (probability distribution functions like the beta distribution) that express the loss of accuracy due to distance from a fixed measurement location and time since the last measurement. Since the channel to the cloud is intermittent, more recent measurements may have been made, but their effect is lost due to lack of communication with the cloud. In addition, there is a natural time delay between when a measurement is made and when it is processed and made available to the intermittent channel.

In the illustrative embodiments the synaptic features may be expressed mathematically as time-varying surfaces or volumes with attributes such as strength and transferred over the intermittent connection to the vehicle in this form. An AI module on the vehicle can process a model of this kind to predict how the model will evolve and how accurate the prediction will be. The weather measurements at specific points, lines, areas, etc. can then be predicted into the future from the model in the vehicle.

Weather servers can access weather measurements from a wide array of devices spread spatially around the world. This allows them to abstract measurements into synoptic weather models that can be represented by mathematical models in four dimensions. These models are often too complex to be used by vehicle systems components, so a method is described here that simplifies synoptic models into weather information that can be used in vehicle features. In many instances, a vehicle system component may care about one or two aspects of weather, and may request or utilize input in the form of parameters associated with those aspects, e.g., temperature at location X (or time X) and humidity at location X (or time X).

Synoptic models can provide the basis of good predictions for a significant amount of time, which helps to eliminate the problems of time lags due to measurement delays and model building, and delays due to the intermittent nature of the connection from the weather server to the vehicle. The models described can be learning models that are trained using low cost weather data from a vehicle sensor. For example, the weather models are able to forecast 10 types of weather information, one of which is temperature. The temperature may also be measured on the vehicle and compared with the temperature from the model. The difference between the model result and the measured result is used as a penalty function. An exploration feature in the model changes model parameters and observes the effect of the changes on the penalty function. An optimization algorithm uses these observations to minimize the penalty function.

At the same time, the currently modeled data can be used to predict the temperature and humidity (to use the system example from above) at a certain point in the future. This can allow for preconditioning if needed, or avoidance of an area, or any other appropriate action taken in response to a particular predicted condition or aspect of weather.

Figure 2:
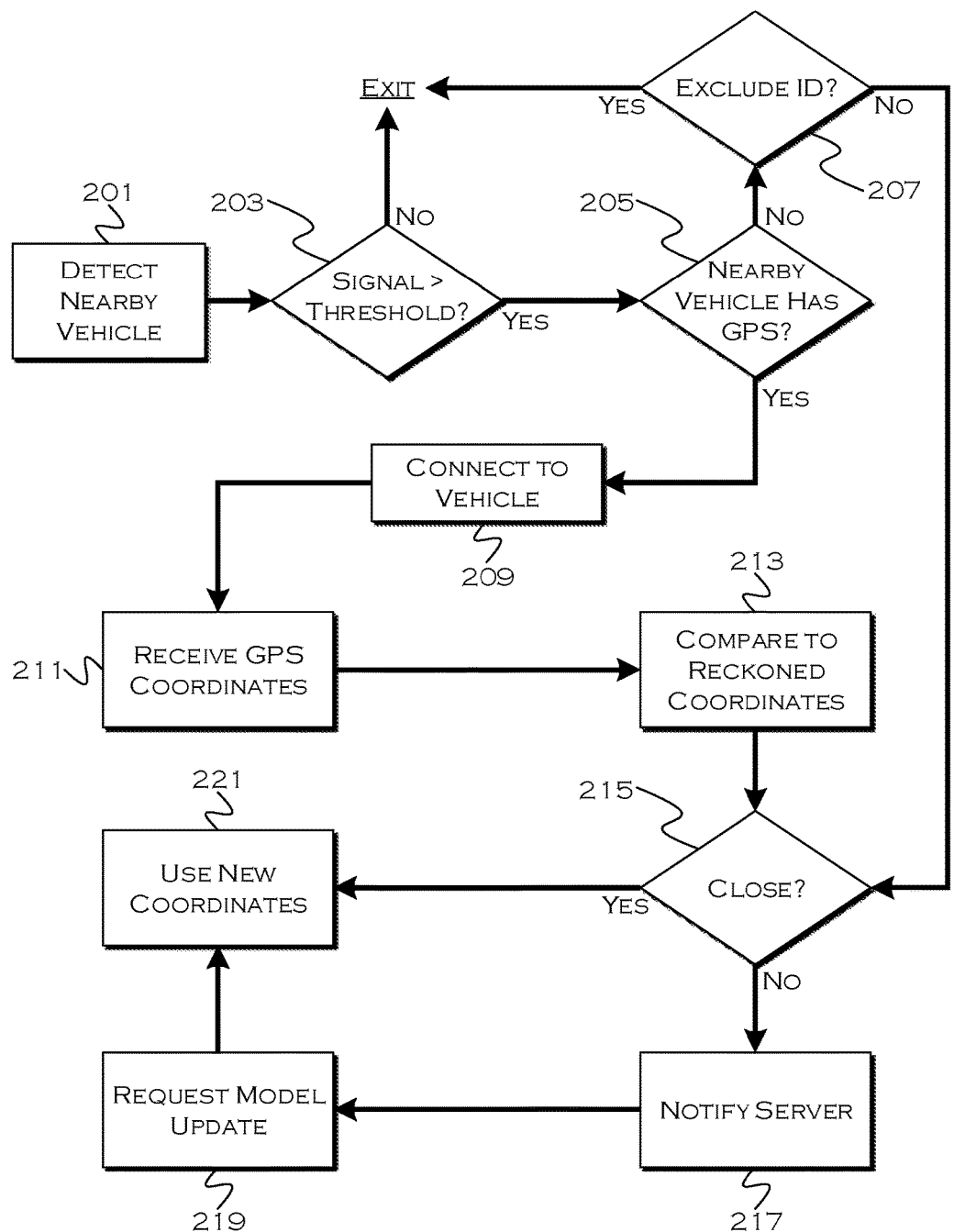
FIG. 2 shows an illustrative process for vehicular sensor data sharing.

FIG. 2 shows an illustrative process for vehicular sensor data sharing. This example demonstrates (through the sharing of GPS coordinates) how one vehicle can share data with another vehicle, to effectively provide the recipient vehicle with "virtual" sensors equivalent (or near equivalent) to the onboard sensors of the sharing vehicle. The reason the sensors are described as "near" equivalent is because the sensor data being shared is gathered at the sharing vehicle, not the receiving vehicle, so the data is slightly off-axis. Nonetheless, receiving data from a relatively nearby vehicle is often sufficient to provide the receiving vehicle with what it needs, avoiding the cost of having to deploy sensors in every vehicle.

In this illustrative embodiment, a vehicle lacking sensors (receiving vehicle) is capable of detecting 201 a signal broadcast from one or more nearby vehicles. This signal can be shared sensor data of any number of types, the sharing vehicle can broadcast either an availability of the sensor data and/or the actual sensor data. In this example, the process detects a broadcast from the nearby vehicle, and determines if the signal 203 received from that vehicle is above a certain threshold, which tends to indicate that the sharing vehicle is within a certain distance from the receiving vehicle (higher signal strength generally indicates closer proximity). If the signal strength indicates that the vehicle is out of proximity, the process may exit 200.

In this example, the process tends to consider signals from vehicles that are relatively nearby (within 20 feet, for example), since the vehicle will be sharing GPS coordinates, the utility of which tends to decay (especially for navigation purposes) if the receiving vehicle is too far from the sharing vehicle. In other examples, such as sharing weather-related data, the process may consider signals from vehicles that are further away, since the weather data in a reasonable locality (a few hundred feet, at least) is unlikely to exhibit significant deviance). Thus, the proximity threshold for sensor data sharing can be tied, to some extent, to the particular type or class of data being shared between the vehicles.

Also, in this example, the process determines 205 if the nearby signal includes GPS sharing. In this example, the sharing vehicle broadcasts a signal indicating sharing capability. The other local vehicles can detect this signal and request shared data of a type indicated in the broadcast. Accordingly, if the sharing vehicle is capable of sharing GPS coordinates, then in this example, the process in the receiving vehicle connects 209 to the sharing vehicle. Otherwise, the receiving vehicle (which is seeking GPS coordinates in this example) excludes 207 the sharing vehicle ID so that it does not have to reconsider the sharing vehicle broadcast at a later time (assuming the sharing vehicle continues to broadcast some shared data availability), if the two vehicles continue to travel in close proximity. For some signals that have limited range of transmission, the process of exclusion 207 may assume the same coordinates as the receiving vehicle (305 in FIG. 3) for the transmitted weather signals or, if the receiving vehicle does not have a position sensor (e.g. GPS, dead-reckoning system, etc), the transmitting object may be used directly. Thus, the range of the signal may be used to determine whether to exclude 207 in a decision and so bypass the comparison 213, and go to the closeness determination 215.

One the receiving vehicle connects to the sharing vehicle, the process on the receiving vehicle receives 211 GPS coordinates from the sharing vehicle. In other examples, where the sensor data is included in the broadcast, the receiving vehicle may simply extract the relevant data. In this example, the process then compares 213 the received coordinates to estimated coordinates called "reckoned" coordinates, which may have been guessed based on a previously identified vehicle position and travel characteristics (e.g., speed and heading) since that time.

Since the sharing vehicle has accurate coordinates and is in close proximity to the receiving vehicle, the process may consider the received coordinates to be the "correct" coordinates of the vehicle, plus or minus some error correction. The process determines 215 if the received coordinates are close (numerically) to the reckoned coordinates. If they are not, that is, if the "real" location reveals that the reckoned location is a bad estimate, the process can notify 217 the server that the reckoning model is off, and may request 219 an updated model from the server. The model may not be immediately updated, but the server can use the observed error to improve the model, and may issue an improved model to the requesting vehicle once sufficient data has been received by the server to improve the model. The vehicle uses 221 the received coordinates to perform navigation or other coordinate-related actions.

While the preceding was described in terms of sharing GPS data, sensor data of any sort can be shared in a similar manner. Similarly, models predicting the data corresponding to the shared data can be updated based on received versions of the predicted data in a similar manner. With regards to, for example, the weather predictions discussed herein, the sharing can include sharing particular sensor data representing an element of the weather model (e.g., temperature, humidity, pressure, etc) and the feedback to the server can help correct the weather model to more accurately reflect the data. If even a subset of vehicles have sharing capable sensors, a larger number of vehicles could be available to report data on a regular basis, through sharing. Further, different vehicles can be provided with varied sharing capable sensors, so that any sample of vehicles may include vehicles having sensors of varied types, wherein those vehicles (not specifically or necessarily the sensors themselves) are capable of sharing the directly gathered information from those sensors.

Figure 3:
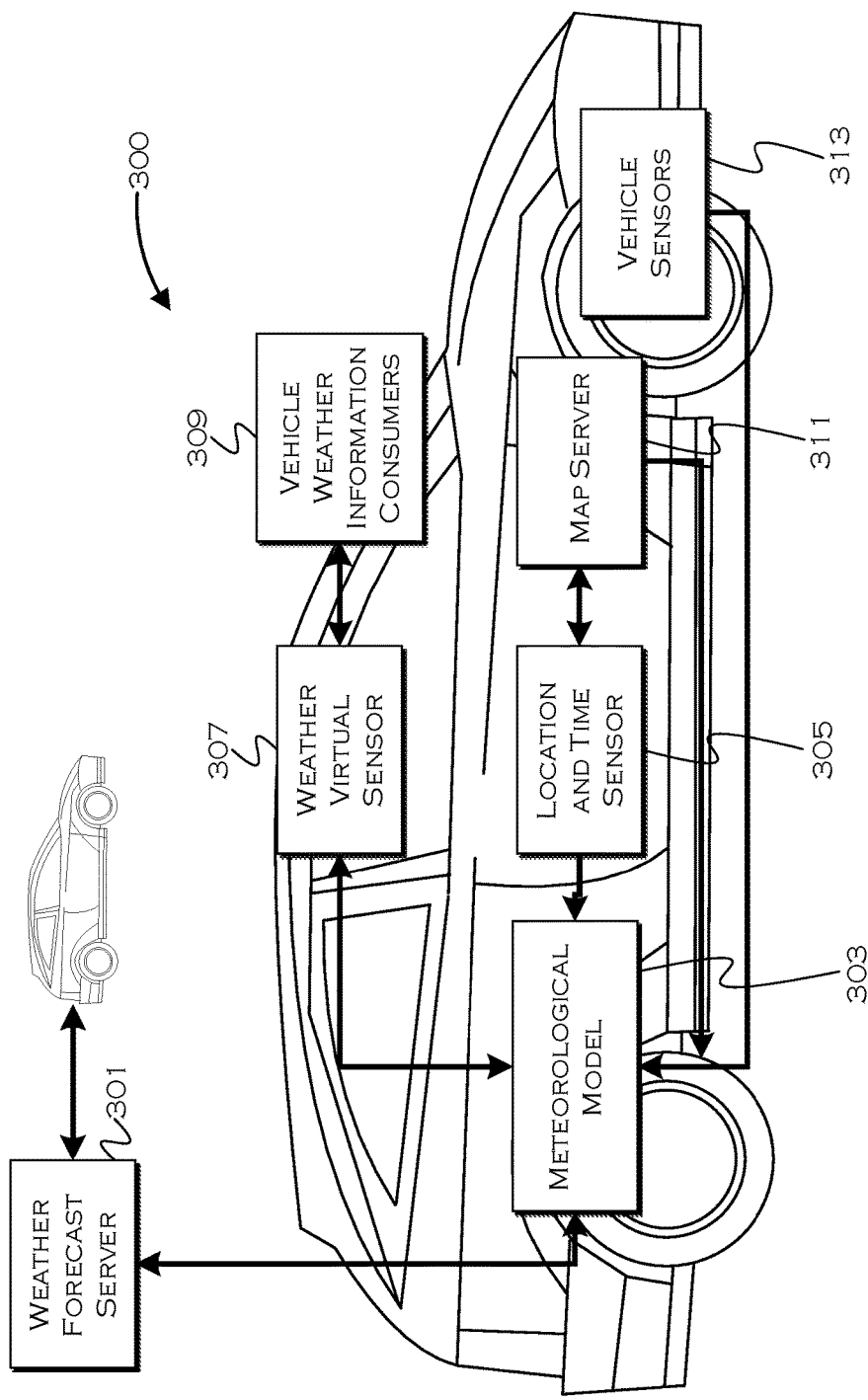
FIG. 3 shows an illustrative vehicle including onboard modeling and sensing capability.

FIG. 3 shows an illustrative vehicle including onboard modeling and sensing capability. In this example, the vehicle 300 may be capable of periodic connection to a weather server 301. The weather forecast server may respond to an onboard meteorological model with synoptic weather information, but the channel/connection may not always be available. A request from a vehicle may include one or more time and location parameters for a current location and/or points along a route along with estimated arrival times for those points. A response from the forecast server may include synaptic data within the requested locales and during the times requested. This would include predictive data for any requested time that is in the future.

The vehicle includes an onboard meteorological model 303, which can provide local (to the vehicle and possible to other receiving vehicles) responses to specific requests for forecast information. The meteorological model may map weather as a system, but from that system may be able to extract and provide parameters and parameter values for particular locations in response to specific electronic control unit (ECU) requests (or other onboard requests). So, for example, if an adaptive heating ventilation and air conditioning (HVAC) module were attempting to keep the cabin temperature consistent, this module may want to know projected temperature models for the next fifteen minutes or miles of a route. Since the weather data is modeled in both time and space, either request could be fulfilled by the model.

The HVAC ECU may request data over a path on a terrestrial surface, and the path is parameterized by the model with estimated arrival times at any given locale. The response from the model could include a spline equation (e.g. a cubic equation) representing, for example, projected values over time as the vehicle progresses through locations to an eventual destination. Or the response could include discrete values extracted based on the spline, in case the ECU was incapable of receiving the spline as a response. The ECU (one example of an information consumer 309) can use the data to adaptively adjust to changing weather patterns and, in this case, keep cabin temperature as consistent as possible (or, for example, precondition a cabin or window to avoid condensation/frost).

The path along which data is provided does not need to be the path the vehicle 300 is traveling on. For example, a wireless communication device might modify its channel model based on weather conditions on a path between the vehicle and the device it is communicating with. Since the vehicle 300 is moving (and potentially the remote vehicle is moving), the communication module may request weather information on a curved surface parameterized in space and time. Similarly, a navigation module might want to evaluate the weather along several paths in which the travel time is affected by the weather itself. In this case the weather parameters can be conveniently expressed by a curved surface to simplify the non-linear computation of cost on each route.

The vehicle also includes a virtual weather sensor 307. This "sensor" receives data from the meteorological model and presents the data to an occupant 309 and/or another vehicle system 309. This sensor can also provide navigation (path) data to the meteorological model (so the model knows what data to extrapolate). This model receives current location and time data from the location and time sensor 305, which also provides location and time data to the meteorological model. A map server/database 311 can provide two or three-dimensional map data for use in modeling weather, which can include three dimensional spatial models of weather modeled in four dimensions (over time over a 3D path). Actual 313 onboard sensors can detect aspects of weather detectable at that particular vehicle (and/or received from other vehicles, although the receipt may occur through the weather virtual sensor as well). Conceptually, the short-range communication module, capable of collecting information from nearby vehicles and infrastructure devices, may also be considered to be a sensor.

As previously noted, vehicle occupants and onboard systems may be some consumers 309 of the weather data or onboard ECUs. The ECUs can include, as an illustrative example, navigation systems (routing around weather), vehicle emergency systems, vehicle notification systems, HVAC, powertrain controls, concierge services, automatic suspension control, etc. Other consumers may include, but are not limited to, first responders (for on-site weather at an accident) and other proximate vehicles.

In an illustrative example, the weather server may provide synoptic weather information that is converted to weather information along a path by the meteorological model. The meteorological model can provide this information (with some loss of accuracy) while the connection to the weather server is broken, based on continued modeling following the parameters and spline data provided from the weather server.

A front (an example of a synoptic feature) is a surface that can be modeled onto a terrestrial surface, and the front surface also moves in time. A math surface such as a four-dimensional spline curve can describe the surface in three spatial dimensions and in time. An error function that varies in three dimensions can describe the increasing error bound with time. Other synoptic objects can be described in a similar way in the weather forecast server and transferred to the meteorological model in the vehicle by sending the spline parameters.

The path through space that is sent in the request from the virtual weather sensor to the meteorological model can be defined with cubic splines parametrized in time, t. Both ends of the communication channel agree on the equations for meridian, latitude and altitude. To transfer the path is then a matter of sending all the coefficients A, B, C, and Ds. In addition, there may be some constraints on the coefficients to ensure the ends meet and the slopes are continuous, the path length is correct, etc.

One use of the method is to anticipate the weather conditions the vehicle is likely to encounter traveling along a route. The path is parameterized in time, but there is an assumption made in the virtual weather sensor that the vehicle will reach a particular location at a particular time (i.e. the anticipated velocity of the vehicle is an input into the path. If the vehicle travels at a different velocity, or if the driver changes a travel path, the virtual sensor may request a new path reflecting the speed change be computed by the meteorological model).

Representative and illustrative spline calculations may be as follows:

$$\text{Spline}_n(t) = \{\text{Meridian}_n(t), \text{Latitude}_n(t), \text{Altitude}_n(t)\}$$

$$\text{Meridian}_n(t) = A_{m,n}t^3 + B_{m,n}t^2 + C_{m,n}t + D_{m,n}$$

$$\text{Latitude}_n(t) = A_{l,n}t^3 + B_{l,n}t^2 + C_{l,n}t + D_{l,n}$$

$$\text{Altitude}_n(t) = A_{a,n}t^3 + B_{a,n}t^2 + C_{a,n}t + D_{a,n}$$

The preceding may represent a path through space sent from the virtual sensor to the meteorological model. The meteorological model may respond with a spline showing a weather parameter over time (presumably along the path received from the virtual sensor). For example:

$$\text{Barometric}_n(t) = A_{b,n}t^3 + B_{b,n}t^2 + C_{b,n}t + D_{b,n}$$

Figure 4:
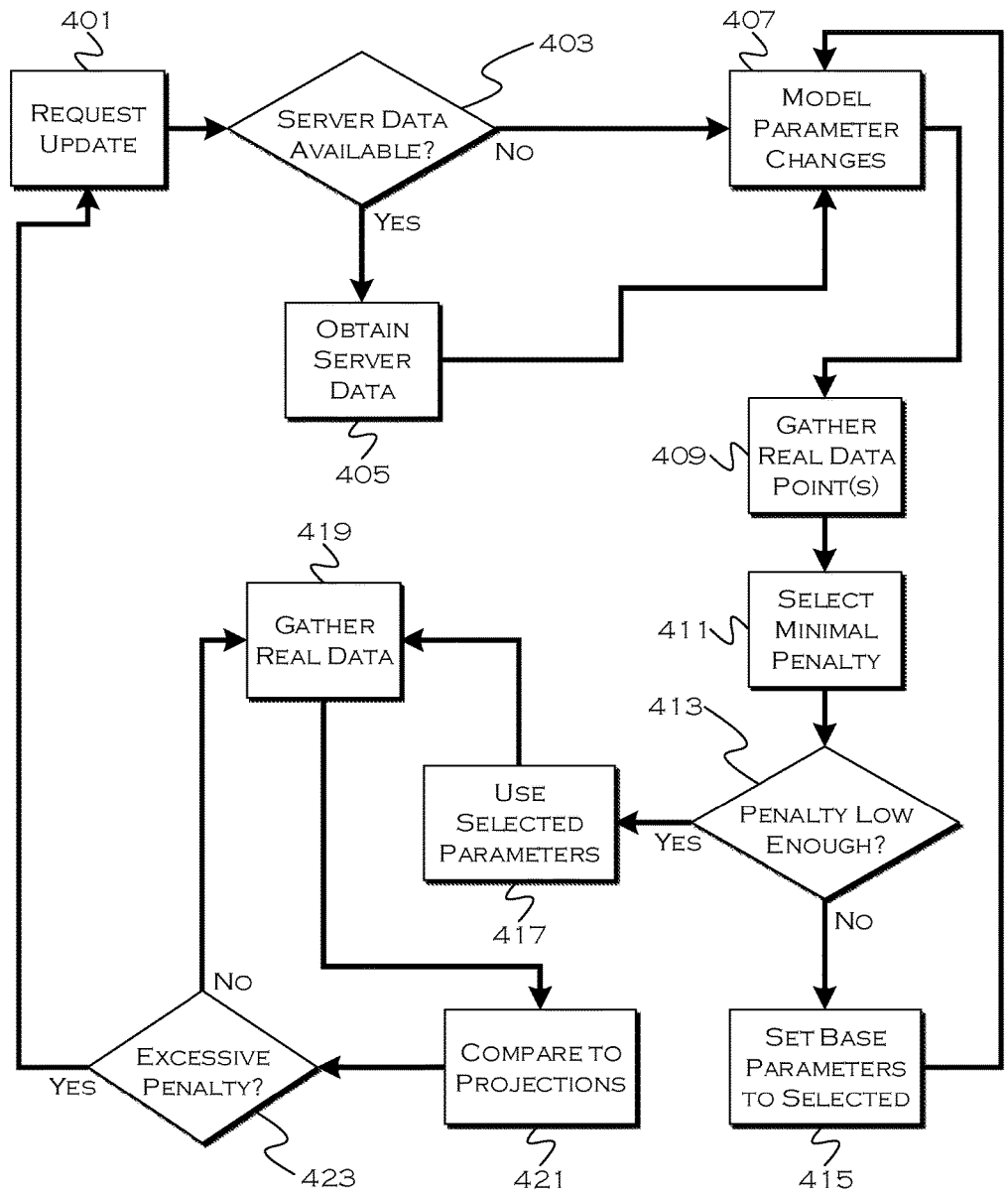
FIG. 4 shows an illustrative process for a weather model update.

FIG. 4 shows an illustrative process for a weather model update to the meteorological model 303. Since live data may reflect an actual value that is different from a projected value, the live values can be used to improve the projection model so that future projections are hopefully more accurate.

In this example, the process in the meteorological model requests 401 an updated version of data from the offboard weather model 301 and a check is made to see if the version is a new version and available 403. If the offboard server data is not available, the process may proceed with utilization of a previously obtained onboard model. In that instance, the "obtained data" can simply be the projected data for a current point in space and time where real data is being gathered.

If the process is able to obtain 405 new data from the remote weather model, the process may provide 407 the updated remote server model to the onboard meteorological model. Since weather patterns can rapidly change, periodically obtaining 405 updated data from the remote server helps keep the onboard predictive model on track. While a weather pattern may persist somewhat predictively for a period of time, it can also dissipate unexpectedly. As can be seen from this process, if an onboard model appears 423 to deviate significantly from real data, the process can simply attempt to obtain an updated set of data from the remote server.

Whether or not the process can use new data from the server, the onboard process is capable of adaptively adjusting parameters associated with the modeling to produce a minimalized penalty function. The penalty function is based on the difference between real (measured) and predicted data, and the system can continually adapt onboard parameters to minimize the function. When the "update" is attempted, the process can model a plurality of sets of varied parameters which may results in multiple predicted data sets for a current measurable data point or points (e.g., set A predicts—temp 35 degrees, humidity 67 percent, pressure 29 Hg, set B predicts—temp 33 degrees, humidity 69 percent, pressure 30 Hg, etc.). For whichever of the data elements are measurable onboard (or obtainable as measurements from a proximate vehicle), the process can gather 409 real data points and compare them to the various predicted data points to minimize a penalty function. The lowest resultant penalty function may define 411 which parameter modifications to use presently, that is, which parameter modifications appear to most accurately provide the truest results.

If the penalty function is low enough 413, the process may use 417 the defined parameters and move forward with data element modeling. If the penalty function is not low enough, the process may set 415 the selected parameters as a baseline and attempt a new set of parameter modification, which will hopefully refine the penalty function to an acceptable point.

While the process is modeling weather element values with a given set of parameter modifications, the process may also continue to gather real data 419. The data can be gathered at discrete points or whenever available, and if the vehicle has few or no onboard sensors, but is relying on passing vehicles for data points, the "whenever available" may be the better approach. The gathered data is compared 421 to projected values at the time and location of gathering (the gathered data can be time and location stamped, so the process can be ongoing without the vehicle actually having to stop, unless an element like "wind speed and heading" which may be affected by vehicle motion, is being gathered). If the comparison results in excessive penalty 423, the process can request another update.

An excessive penalty may be the result of a rapid change in weather pattern in an unexpected manner, and so new data may provide a better model. Even if the new data is not available, the request may result in a parameter modification update from the modeling at 407, so a better set of modified parameters may be obtained to keep the predictions closer to accurate in light of the changing weather patterns. The excessive penalty may be a large penalty function associated with a few measurements, increasing penalty functions with successive measurements, aggregate penalties over a threshold or any other suitable basis to suggest that the current model may be straying from accuracy.

Figure 5:
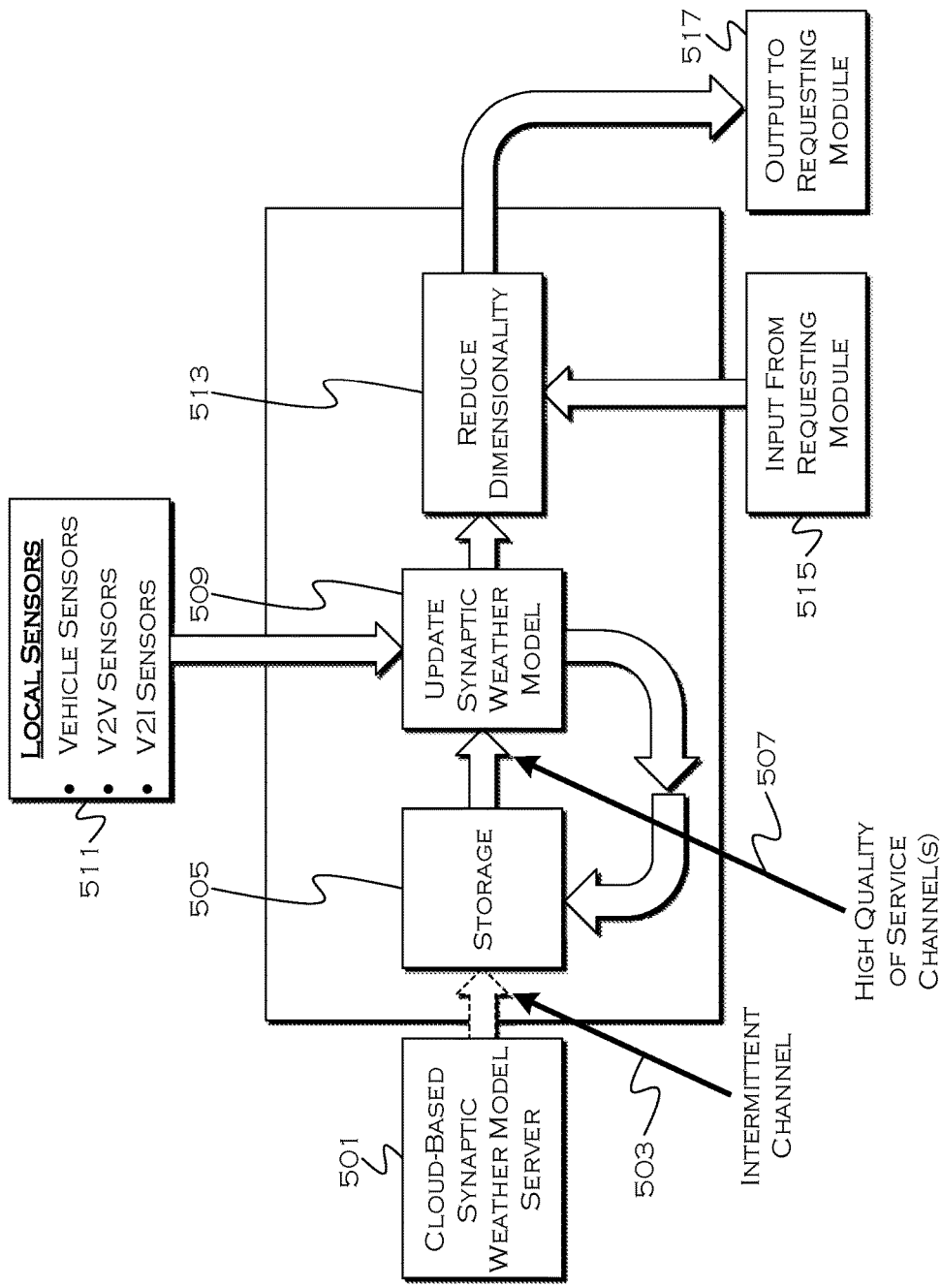
FIG. 5 shows another illustrative relationship between weather modeling and weather using modules.

FIG. 5 shows another illustrative relationship between weather modeling and weather using modules. In this example, a remote cloud-based process 501 creates synaptic models and sends them to onboard storage 505. Unfortunately, there is a delay in when these models are available, from when they are created, and further, the connection 503 is typically intermittent. Weather is constantly changing, and yet the model on the vehicle may be based on old and less-relevant data.

The onboard storage is connected to a local synaptic model 509, and that model is connected to the storage through a high quality of service channel 507. The local model receives data from onboard vehicle sensors 511, and uses this data, along with the cloud-provided synaptic model 501, in order to update and maintain the local synaptic model 509. When a request comes from a vehicle module 515, the process acts to reduce dimensionality 513 of the 4D local model. This output (typically 2.5 dimensional output) is sent to the requesting module 517.

Figure 6:
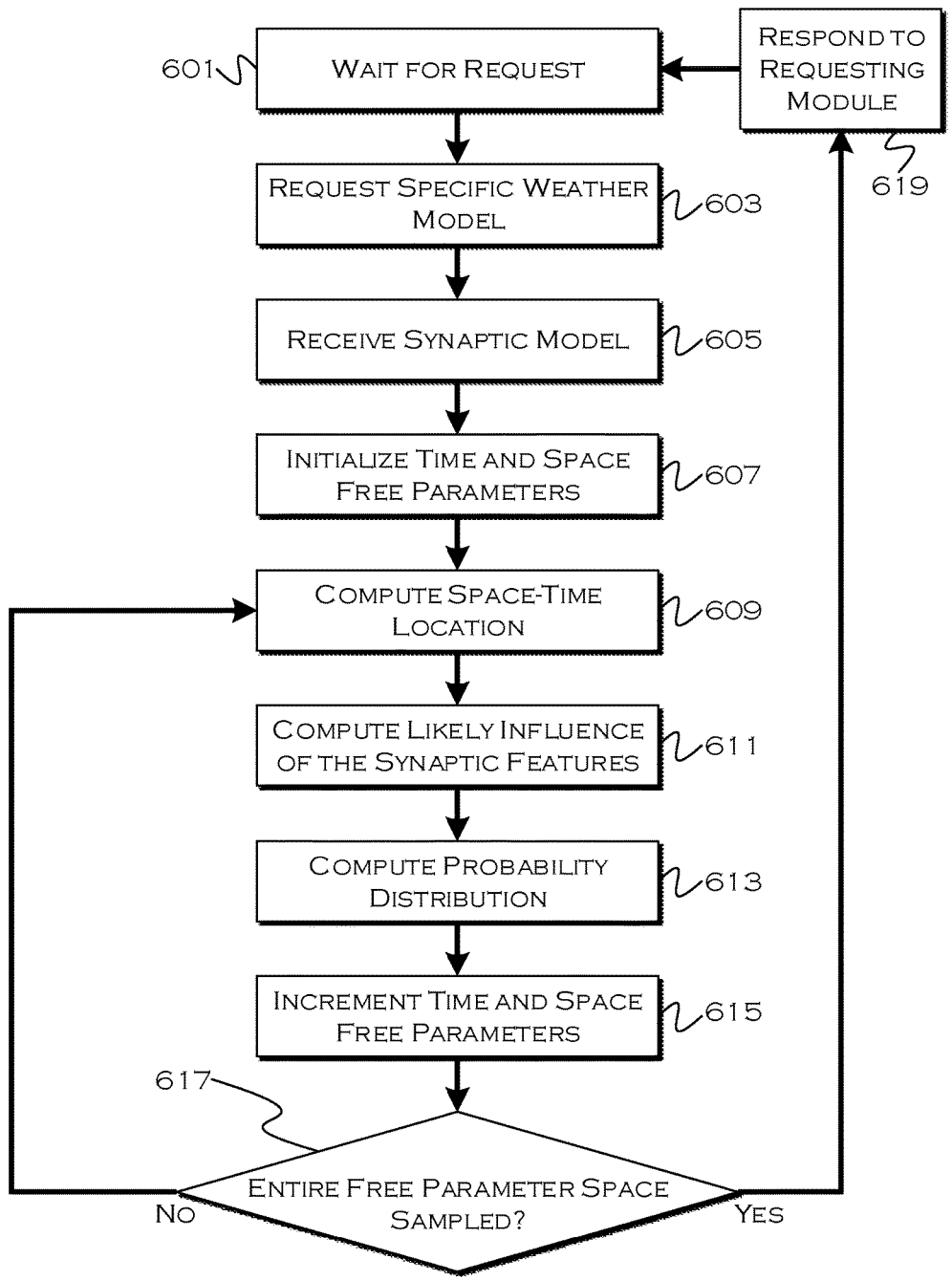
FIG. 6 shows an illustrative process for reducing a weather model to a 2.5 dimensional model.

FIG. 6 shows an illustrative process for reducing a weather model to a 2.5 dimensional model 503. The onboard modeling process can continually update the four dimensional model and flatten the model along channels of interest when requests are received from vehicle modules. This is the waiting period 601. When the process receives 603 a request from another vehicle module, this request often is for specific synaptic data for a specific volume defined in space and time.

The process receives 605 the synaptic model in its most recently updated form from local storage, and initializes 607 time and space free parameters related to the model. These parameters define the localities along which the flattening will occur, as well as expected arrival times so that the predicted weather correlates to when a vehicle is actually supposed to arrive at a location. These parameters allow the process to compute 609 a space-time location in synaptic model coordinates corresponding to the free parameters. The process can also determine 611 the likely influence of synaptic features on the location in space-time.

The process continues to compute 613 the probability distribution of the requested meteorological values (e.g., temperature, pressure, etc.) at the space-time location. Then the process increments the space and time free parameters, defining a new location at a new time. If the entire free parameter space defined by the request has been sampled 617, the process can return 619 parameters (such as a spline curve) defining the projected meteorological values over the range of space and time defined by the request.

In this example, the consuming (requesting) module may contain a math model with a specified dimensionality and a range for the free parameters. When the response is a spline curve, it is over the free parameter space that computes free parameters for a distribution function. For example, the response could be two spline curves in the space-time free parameter space, one for the $\alpha$ parameter of a beta distribution and one curve for the $\beta$ parameter of the beta distribution. Thus, for any point in the space-time free parameter range, there is a resulting ($\alpha$, $\beta$) that can be used to compute the beta distribution for that point.

Through the use of the illustrative embodiments, a vehicle can periodically receive updated weather patterns from a remote server, and use that data to model predicted weather parameters along a given path. The model is capable of adapting to changing conditions, and can responsively change and/or request updated data as the weather deviates from projections. Through the use of sensor sharing, the vehicle often does not need a full suite of onboard sensors in order to gather enough real data to continue to adapt the model.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive weather data including a plurality of measured data points in an area around a vehicle, from a remote weather server;
receive a path from a vehicle subsystem;
combine the measured data points and the path to form a predictive model reflecting expected weather conditions along the path at future times, the model based on predefined parameters defining expected weather behavior;
obtain a real-time value of one or more aspects of the expected weather conditions;
compare the real-time value to an expected value derived from the model;
assign a penalty function based on a deviance between the real-time value and the expected value;
adjust the predefined parameters to adjust the expected value until the penalty function resulting from the comparison is below a predefined threshold; and
send the model, based on the adjusted predefined parameters, to a requesting vehicle subsystem.

2. The system of claim 1, wherein the processor is configured to form the predictive model in the form of a cubic spline, representing latitude, longitude, altitude and time.

3. The system of claim 2, wherein the cubic spline represents an aspect of weather.

4. The system of claim 3, wherein the aspect of weather includes temperature.

5. The system of claim 3, Wherein the aspect of weather includes barometric pressure.

6. The system of claim 3, wherein the aspect of weather includes visibility.

7. The system of claim 3, wherein the aspect of weather includes humidity.

8. The system of claim 3, wherein the aspect of weather includes estimated road frictional coefficient.

9. The system of claim 3, wherein the aspect of weather includes precipitation.

10. The system of claim 3, wherein the aspect of weather includes wind speed and heading.

11. The system of claim 1, wherein the processor is configured to obtain the real-time value from an onboard vehicle sensor.

12. The system of claim 1, wherein the processor is configured to obtain the real-time value wirelessly from a proximate vehicle.

13. The system of claim 12, wherein the processor is configured to determine whether the proximate vehicle is within a predefined proximity, determined by a received signal strength or by transmitted special coordinates, prior to wirelessly obtaining the real-time value.

14. The system of claim 12, wherein the predefined proximity varies based on an aspect of weather to which the real-time value applies.

15. A computer-implemented method comprising:
- modeling a plurality of expected values for a weather aspect based on measured data points received from a remote server and predefined modeling parameters, including varying the predefined parameters to produce the plurality of expected values;
- comparing a real-time measured aspect value against a modeled expected aspect value for each of the plurality of expected values;
- selecting a modified parameter set corresponding to the modeled expected aspect value demonstrating the most minimal difference from the real-time measured aspect value;
- gathering real-time measured aspect values as the vehicle travels the vehicle path;
- comparing the gathered real-time measured aspect values to modeled expected aspect values from the modeled weather along the vehicle path;
- repeating the steps of modeling, comparing the gathered real-time measured aspect value against the modeled expected aspect value for each of the plurality of expected values, and selecting, responsive to a deviance above a threshold between the gathered real-time measured aspect values and modeled expected aspect value resulting from the modeled weather along the vehicle path, until there is no deviance above the threshold between any of the gathered real-time measured aspect values and modeled expected aspect values;
- using the selected parameter set, resulting from the repeating, to model weather along the vehicle path; and
- providing the modeled weather along the vehicle path to a requesting vehicle subsystem.

16. The method of claim 15, wherein the real-time value is gathered wirelessly from a proximate vehicle, and further comprising determining whether the proximate vehicle is within a predefined proximity, determined by a received signal strength or by transmitted special coordinates, prior to wirelessly gathering the real-time value, wherein the predefined proximity varies based on an aspect of weather to which the real-time value applies.

17. A system comprising:
a processor configured to:
- model a plurality of weather aspects over a path of a vehicle, received from a subsystem of the vehicle, based on measured data points received from a remote server and predefined modeling parameters;
- adjust the predefined modeling parameters, as the vehicle travels the path, to maintain a weather model for which periodic real-time measurements compared to expected values obtained from the weather model remain below a threshold deviance.

* * * * *